United States Patent
Ishii (10) Patent No.: US 8,514,276 B2
(45) Date of Patent: Aug. 20, 2013

(54) APPARATUS FOR MANIPULATING VEHICULAR DEVICES

(75) Inventor: Kosei Ishii, Chiba (JP)

(73) Assignees: Hyundai Motor Japan R&D Center, Inc., Yokohama (JP); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 757 days.

(21) Appl. No.: 12/572,155

(22) Filed: Oct. 1, 2009

(65) Prior Publication Data

US 2010/0238280 A1    Sep. 23, 2010

(30) Foreign Application Priority Data

Mar. 19, 2009   (JP) ................................. 2009-067204

(51) Int. Cl.
*H04N 9/47*    (2006.01)

(52) U.S. Cl.
USPC .......................................................... 348/77

(58) Field of Classification Search
None
See application file for complete search history.

(56) References Cited

U.S. PATENT DOCUMENTS

| | | | |
|---|---|---|---|
| 5,594,469 A * | 1/1997 | Freeman et al. | 345/158 |
| 7,477,140 B1 * | 1/2009 | Booth et al. | 340/471 |
| 7,579,940 B2 * | 8/2009 | Schofield et al. | 340/425.5 |
| 2009/0167682 A1 * | 7/2009 | Yamashita et al. | 345/158 |
| 2009/0231145 A1 * | 9/2009 | Wada et al. | 340/575 |
| 2009/0268025 A1 * | 10/2009 | Hiramaki et al. | 348/148 |

FOREIGN PATENT DOCUMENTS

| | | |
|---|---|---|
| JP | 2004-243898 A | 9/2004 |
| JP | 2005-138755 A | 6/2005 |
| JP | 2005-335510 A | 12/2005 |
| JP | 2006-219000 A | 8/2006 |
| JP | 2007-286696 A | 11/2007 |
| JP | 2007-296889 A | 11/2007 |
| JP | 2007-302116 A | 11/2007 |
| JP | 2008-210359 A | 9/2008 |
| KR | 1995-0027663 | 10/1995 |
| KR | 10-0185452 B1 | 12/1998 |

\* cited by examiner

*Primary Examiner* — Peling Shaw
(74) *Attorney, Agent, or Firm* — Edwards Wildman Palmer LLP; Peter F. Corless (57) ABSTRACT

The present invention provides an apparatus for manipulating vehicular devices. In preferred embodiments, the apparatus described by the present invention includes a manipulator checking unit, a photographing unit, a plurality of image display units, a line of sight detection unit, a line of sight region determination unit, and a display control unit. The invention also features a motor vehicle comprising the apparatus for manipulating vehicular devices as described herein.

13 Claims, 10 Drawing Sheets

APPARATUS FOR MANIPULATING VEHICULAR DEVICES

CROSS-REFERENCE TO RELATED APPLICATION

This application claims under 35 U.S.C. §119(a) the benefit of Japanese Patent Application No. 2009-67204 filed Mar. 19, 2009, the entire contents of which are incorporated herein by reference.

BACKGROUND (a) Technical Field

The present disclosure relates to an apparatus for manipulating vehicular devices. In certain preferred embodiments, the present invention relates to an apparatus for manipulating vehicular devices which is capable of rapidly selecting manipulation screens for various vehicular devices based on the manner in which a driver suitably holds his gaze upon each of the manipulation screens using his or her line of sight.

(b) Background

Figure 8:
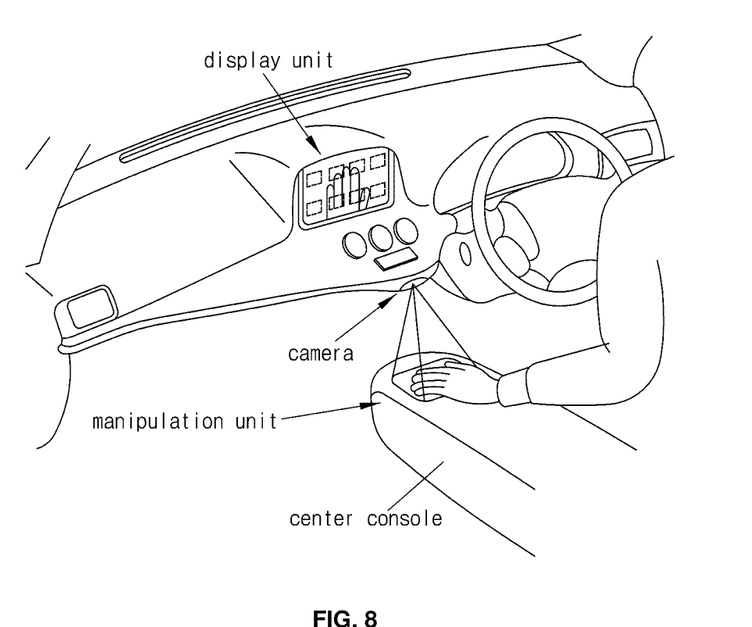
FIG. 8 is a view showing the appearance of a conventional apparatus for manipulating vehicular devices.

Japanese Unexamined Patent Publication No. 2007-286696, incorporated by reference in its entirety herein, is directed to an input apparatus for photographing a hand on a manipulation unit, overlaying a captured image of the hand on the manipulation screen of a display unit, and enabling a manipulator to perform manipulation while viewing the overlaid image. The 2007-286696 publication teaches an input apparatus where a hand is displayed on the display unit, so that a manipulator can perform manipulation while viewing only the display unit without needing to view the manipulation unit. For example, the 2007-286696 reference teaches that a user can perform manipulation without directing his line of sight towards the manipulation unit. Certain examples of such an input apparatus are illustrated in FIG. 8. For example, the manipulation unit is suitably mounted on a center console, a manipulator's hand is preferably photographed on the manipulation unit through a camera, and an image of the hand captured on the manipulation unit is suitably overlaid on the manipulation screen of the display unit. In this example, the number of display units is one, so that one of a plurality of vehicular devices, such as an air conditioner, an audio system and a car navigation system, is suitably invoked and displayed, and then a necessary instruction is suitably issued from the manipulation unit.

In certain examples, for example as shown in the input apparatus of FIG. 8, first, a manipulator must preferably select a desired vehicular device through a menu screen. Preferably, on the menu screen there are arranged buttons for selecting, for example, an air conditioner, an audio system, a car navigation system, etc. A desired manipulation screen can be suitably invoked by invoking the menu screen, overlaying a finger on a button for selecting a desired vehicular device and then suitably pressing a switch of the manipulation unit. Accordingly, the selection of a vehicular device is can be considerably burdensome and time-consuming for a driver. Further, in a case with an increased number of vehicular devices, the number of layers of the menu screen is suitably increased, so that the manipulation of the vehicular devices becomes suitably more complicated.

Accordingly, in order to alleviate the burden of the selection of vehicular devices using the menu screen, a plurality of display units, rather than a single display unit, is preferably arranged on an instrument panel and manipulation screens for respective vehicular devices are always displayed, thereby suitably eliminating the selection of the vehicular devices. Preferably, in this case, dedicated manipulation switches are preferably provided for the respective display units. As a result, a driver cannot suitably manipulate a touch panel unless the driver considerably extends his or her arm. Furthermore, since it is necessary to direct the line of sight to the display unit and the manipulation unit, attention may be diverted away from driving.

The above information disclosed in this Background section is only for enhancement of understanding of the background of the invention and therefore it may contain information that does not form the prior art that is already known in this country to a person of ordinary skill in the art.

SUMMARY

The present invention provides an apparatus for manipulating vehicular devices which enables a user to simply and rapidly select and manipulate vehicular devices, thereby allowing the vehicular devices to be manipulated without impairing a driver's driving.

In a preferred embodiment, the present invention provides an apparatus for suitably manipulating vehicular devices, including a manipulator checking unit for suitably checking whether a manipulator is a driver; a photographing unit for suitably photographing the manipulator's hand; a plurality of image display units for suitably displaying respective manipulation screens for vehicular devices; a line of sight detection unit for suitably detecting the driver's line of sight; a line of sight region determination unit for suitably detecting an image display unit upon which a steady gaze was held based on the driver's line of sight detected by the line of sight detection unit; and a display control unit for, if the manipulator checking unit determines the manipulator to be the driver and the line of sight region determination unit detects the image display unit upon which the driver held a steady gaze, suitably overlaying the shape of the photographed hand on the manipulation screen of the image display unit upon which the driver held a steady gaze.

In another preferred embodiment, the display control unit preferably changes the locations of the manipulation screens displayed on the plurality of image display units so that the manipulation screen on which the shape of the hand has been overlaid is suitably displayed on the image display unit closest to the driver.

In another preferred embodiment, the apparatus preferably further includes an HUD unit for suitably projecting the manipulation screen onto a windshield of a vehicle; and an HUD ON switch for suitably directing that the manipulation screen on which the shape of the hand has been overlaid be displayed on the HUD unit.

Other aspects and preferred embodiments of the invention are discussed infra.

Accordingly, in the apparatus for manipulating vehicular devices according to preferred embodiments of the present invention, the line of sight detection unit and the line of sight region determination unit for suitably detecting whether a driver held a steady gaze on an image display unit are preferably provided and control is performed such that a manipulation screen for a vehicular device displayed on an image display unit upon which a steady gaze was held can be selected, so that the present invention suitably enables the selection of a vehicular device to be simply and rapidly performed, compared with the case where a menu screen is invoked and a desired vehicular device is selected. In related embodiments of the present invention, since a driver's steady gaze can be sufficiently detected within about 0.16 seconds, the present invention does not suitably impair a driver's driving.

Furthermore, according to further preferred embodiments of the present invention, since the selection of an image display unit based on a steady gaze is suitably limited to the case where the manipulator checking unit detects a steady gaze based on a driver's line of sight, there is no case where an image display unit is erroneously selected. In further related embodiments, since the shape of the hand is suitably overlaid and displayed on the manipulation screen of an image display unit selected in such a way that the driver held a steady gaze on the manipulation screen, the driver can easily check the process of manipulation.

According to further preferred embodiments, since the display control unit has a function of preferably moving and displaying the manipulation screen of a selected image display unit to and on an image display unit closest to a driver, the driver can suitably manipulate the manipulation screen without directing his or her line of sight far away from the front of a vehicle.

According to still other preferred embodiments, since an HUD unit is preferably provided on the windshield of a vehicle and a manipulation screen for a vehicular device which has moved to an image display unit closest to a driver is also preferably displayed on the HUD unit by the driver pressing an HUD ON switch, the present invention suitably enables manipulation to be performed by minor movement of the line of sight, compared with the case where a manipulation screen is displayed on an image display unit closest to a driver.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus do not impose limitations on the present invention, and wherein:

FIGS. 4A and 4B are diagrams illustrating the manipulation unit and manipulator checking unit of FIG. 1, wherein

It should be understood that the appended drawings are not necessarily to scale and present a somewhat simplified representation of various preferred features illustrative of the basic principles of the invention. The specific design features of the present invention as disclosed herein, including, for example, specific dimensions, orientations, locations, and shapes will be determined in part by the specifically desired application and environment within which it is used.

In the figures, reference numbers refer to the same or equivalent parts of the present invention throughout the several figures of the drawing.

DETAILED DESCRIPTION

The present invention provides, in one aspect, an apparatus for manipulating vehicular devices, comprising a manipulator checking unit, a photographing unit, one or more plurality of image display units, a line of sight detection unit, a line of sight region determination unit, and a display control unit.

In one embodiment, the manipulator checking unit is used for checking whether a manipulator is a driver.

In another embodiment, the photographing unit is used for photographing the manipulator's hand.

In another embodiment, the one or more image display units are used for displaying respective manipulation screens for vehicular devices.

In another related embodiment, the line of sight detection unit is used for detecting the driver's line of sight.

In another further embodiment, the line of sight region determination unit is used for detecting an image display unit upon which a steady gaze is held based on the driver's line of sight detected by the line of sight detection unit.

In another embodiment, the display control unit is used for overlaying a shape of the photographed hand on a manipulation screen of the image display unit upon which the driver held a steady gaze.

In another related embodiment, the display control unit overlays a shape of the photographed hand on the manipulation screen on the image display unit if the manipulator checking unit determines the manipulator to be the driver and the line of sight region determination unit detects the image display unit upon which the driver held a steady gaze.

In another aspect, the invention features an apparatus for manipulating vehicular devices, comprising a manipulator checking unit, a photographing unit, one or more image display units, a voice recognition unit, and a display control unit.

In one embodiment, the manipulator checking unit is used for checking whether a manipulator is a driver.

In another embodiment, the photographing unit is used for photographing the manipulator's hand.

In still another related embodiment, the one or more image display units are used for displaying respective manipulation screens for vehicular devices.

In another embodiment, the voice recognition unit is used for recognizing the driver's voice input through a microphone and detecting a vehicular device selected by the driver's voice.

In a further embodiment, the display control unit is used for overlaying a shape of the photographed hand on a manipulation screen of an image display unit for the vehicular device selected by the driver.

In another further embodiment, the display control unit overlays a shape of the photographed hand on the manipulation screen on the image display unit if the manipulator checking unit determines the manipulator to be the driver and the voice recognition unit detects the vehicular device selected by the driver's voice.

The invention also features a motor vehicle comprising the apparatus for manipulating vehicular devices of any one of the aspects as described herein.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
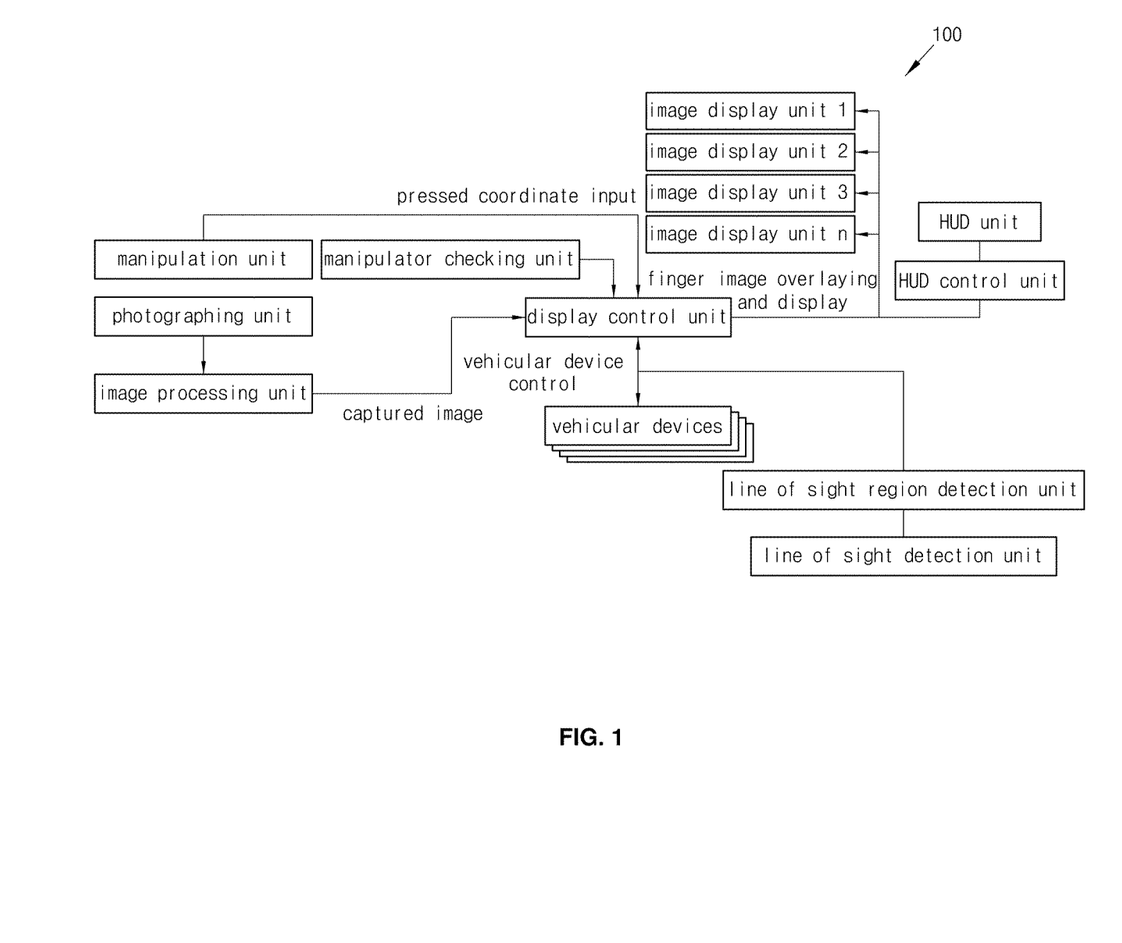
FIG. 1 is a block diagram showing an apparatus for manipulating vehicular devices according to preferred embodiments of the present invention.

According to certain exemplary embodiments, for example FIG. 1 is a block diagram showing an apparatus for manipulating vehicular devices according to the present invention. Preferably, the manipulation apparatus 100 according to the present invention includes a manipulation unit suitably equipped with a touch panel, a manipulator checking unit, a photographing unit suitably configured to photograph a hand on the manipulation unit, an image processing unit suitably configured to extract the shape of the hand from an image captured by the photographing unit, a display control unit suitably configured to control manipulation screens for a plurality of vehicular devices, a plurality of image display units suitably configured to display respective manipulation screens for the plurality of vehicular devices, a head-up display unit (hereinafter referred to as "an HUD unit") suitably mounted on the windshield of a vehicle, an HUD control unit suitably configured to control images projected onto the HUD unit, a line of sight detection unit configured to include a camera for detecting a driver's line of sight, and a line of sight region determination unit suitably configured to detect an image display unit on which a steady gaze was held based on the driver's line of sight detected by the line of sight detection unit through image processing.

Figure 2:
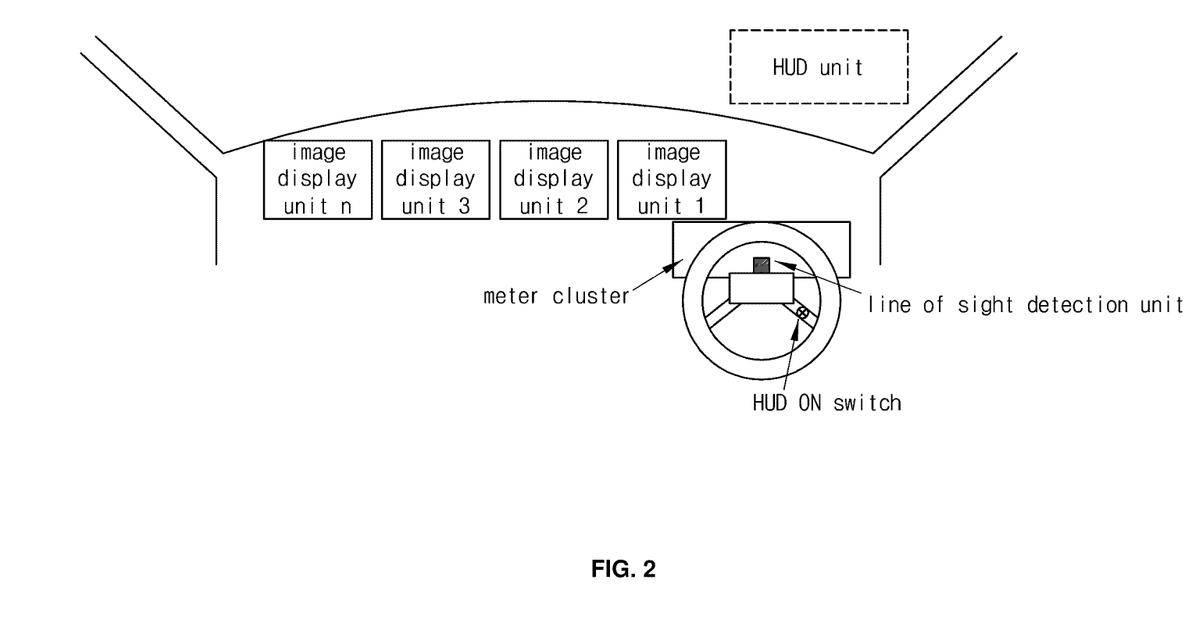
FIG. 2 is a schematic diagram showing the locations of the image display unit, HUD unit and line of sight detection unit of the apparatus of FIG. 1 in the inside of a vehicle.

According to other embodiments of the invention, for example as shown in FIG. 2, FIG. 2 is a schematic diagram showing the preferred locations of the image display unit, HUD unit and line of sight detection unit of the apparatus of FIG. 1 in the inside of a vehicle. Preferably, the HUD unit is mounted on the portion of the windshield 1 of a vehicle in front of a driver's seat, and suitably displays the information of a manipulation screen over a view visible while looking towards the front of a vehicle. Furthermore, a plurality of image display units is suitably provided in association with the plurality of vehicular devices. In further preferred embodiments of the invention, for example as shown in FIG. 2, an image display unit 1, an image display unit 2, an image display unit 3, and an image display unit n are suitably arranged on an instrument panel. Preferably, the line of sight detection unit is suitably disposed on the center portion of a steering wheel 2, and suitably detects a driver's line of sight. According to further preferred embodiments, the line of sight detection unit suitably determines whether the line of sight extends to the region of one of the image display units. In related embodiments, since the size of each image display unit is relatively large, it is suitably easy to determine the region to which the line of sight extends.

Figure 3:
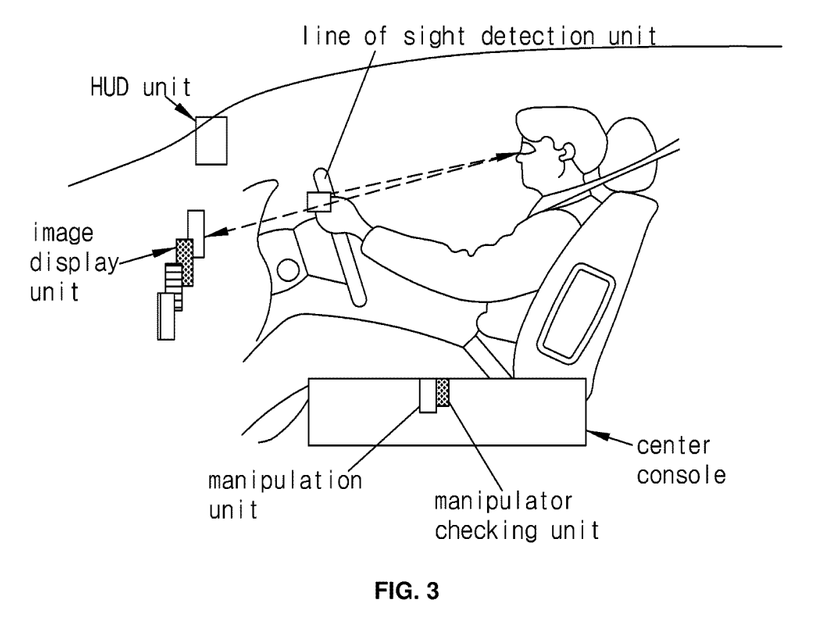
FIG. 3 is a side view showing the relationship in location between the image display unit, HUD unit, line of sight detection unit and manipulation unit of the manipulation apparatus of FIG. 1 and a driver.

According to other preferred embodiments of the invention and as shown in FIG. 3 for example, FIG. 3 is a side view showing a preferred relationship in location between the image display unit, HUD unit, line of sight detection unit and manipulation unit of the manipulation apparatus of FIG. 1 and a driver. Preferably, and as shown in FIG. 3, the manipulation unit is suitably mounted on a center console 3 beside a driver's seat, the plurality of image display units is suitably mounted on an instrument panel, the HUD unit is suitably mounted on the windshield of a vehicle, and the line of sight detection unit is suitably mounted on the center portion of the steering wheel 2. According to preferred related embodiments the HUD unit is preferably provided with a transparent screen, and is configured such that information preferably projected from the instrument panel is suitably reflected and then enters a driver's eyes.

Figure 4A:
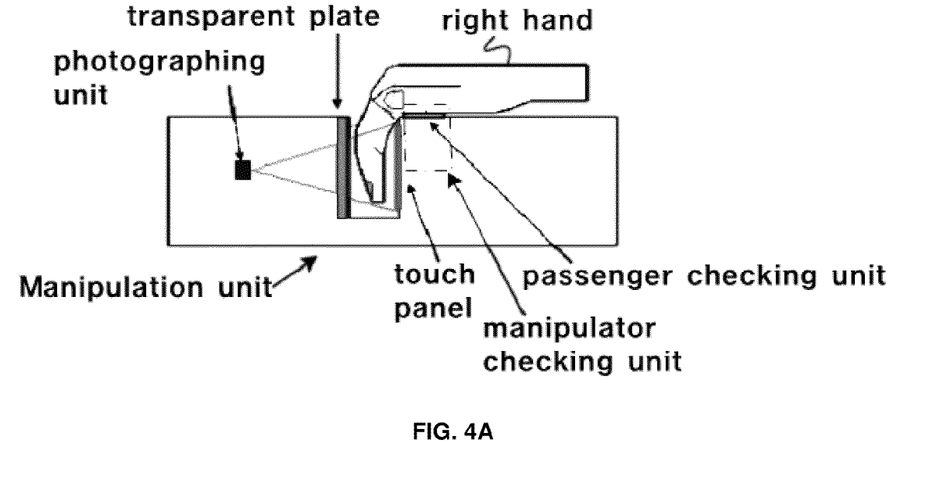
FIG. 4A is a sectional view of the manipulation unit and the manipulator checking unit.
Figure 4B:
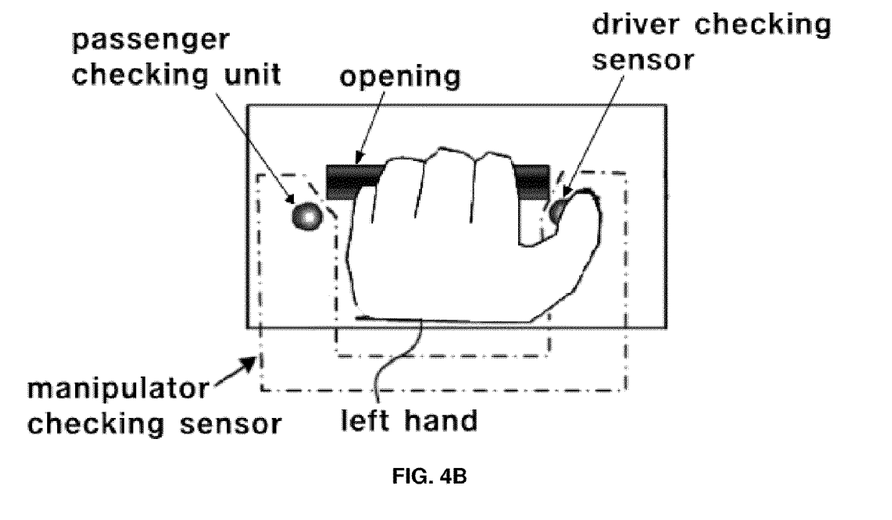
FIG. 4B is a plan view of the manipulation unit and the manipulator checking unit.

According to other preferred embodiments of the invention and as shown in FIG. 4, for example, FIGS. 4A and 4B are diagrams illustrating a preferred manipulation unit and manipulator checking unit of FIG. 1, wherein FIG. 4A is an exemplary sectional view of the manipulation unit and the manipulator checking unit, and FIG. 4B is an exemplary plan view of the manipulation unit and the manipulator checking unit. According to further preferred embodiments, a vehicle is illustrated as having a steering wheel on the right side thereof, as shown in FIG. 3. According to other preferred embodiments, and as shown in FIG. 4A, manipulation is suitably performed by inserting a finger into a depression 4 provided in the center console. Preferably, the photographing unit, which is a camera, is suitably disposed in front of the depression 4. In related embodiments, a transparent plate is suitably attached to one side of the depression 4, while a touch panel is suitably attached to another side of the depression 4. Preferably, the touch panel is formed of, for example, a pressure sensor, and can suitably detect a location where pressure is applied by a finger in the form of coordinates. Preferably, the region of the touch panel is suitably associated with a manipulation screen, so that, when a finger has moved to the location of a manipulation button displayed on the manipulation screen and has pressed the touch panel, the manipulation button is suitably determined to have been pressed.

According to other preferred embodiments of the present invention, driver checking means is suitably installed in the manipulator checking unit. In the illustrated embodiment, a driver checking sensor and a passenger checking sensor are preferably included. For example, as shown in FIG. 4B, in the case of a steering wheel on the right side of the vehicle, a driver's left hand is preferably placed on the manipulation unit, so that the driver checking sensor is suitably provided at a location where the thumb of the left hand will be placed. In related embodiments, when a passenger suitably performs manipulation, the right hand of the passenger is preferably placed into the manipulation unit, so that the passenger checking sensor is suitably provided at a location where the thumb of the right hand will be placed. Accordingly, when the driver checking sensor and the passenger checking sensor are employed, a driver's manipulation and a passenger's manipulation can be suitably distinguished from each other and be detected separately, so that manipulations can be divided into manipulations available only to a driver and manipulations available only to a passenger and control can be suitably performed separately for manipulations available only to a driver and manipulations available only to a passenger. Preferably, the checking sensors may be formed of electrostatic sensors, optical sensors, pressure sensors or the like, although not limited only to the above. Furthermore, according to other preferred embodiments of the present invention, the driver checking means is not limited to the above-described driver checking means (the above-described checking sensor), but may be suitably formed of a pressure switch, rather than the checking sensor. According to other preferred embodiments, whether a manipulator is a driver may be implemented using the photographing unit and the image processing unit. For example, in certain preferred embodiments of the invention, whether a manipulator is a driver may be suitably determined based on the length of a photographed index finger, middle finger or ring finger. Alternatively, in other embodiments, whether a manipulator is a driver may be suitably determined by detecting the direction of insertion of the hand into the manipulation unit using a sensor.

Figure 5:
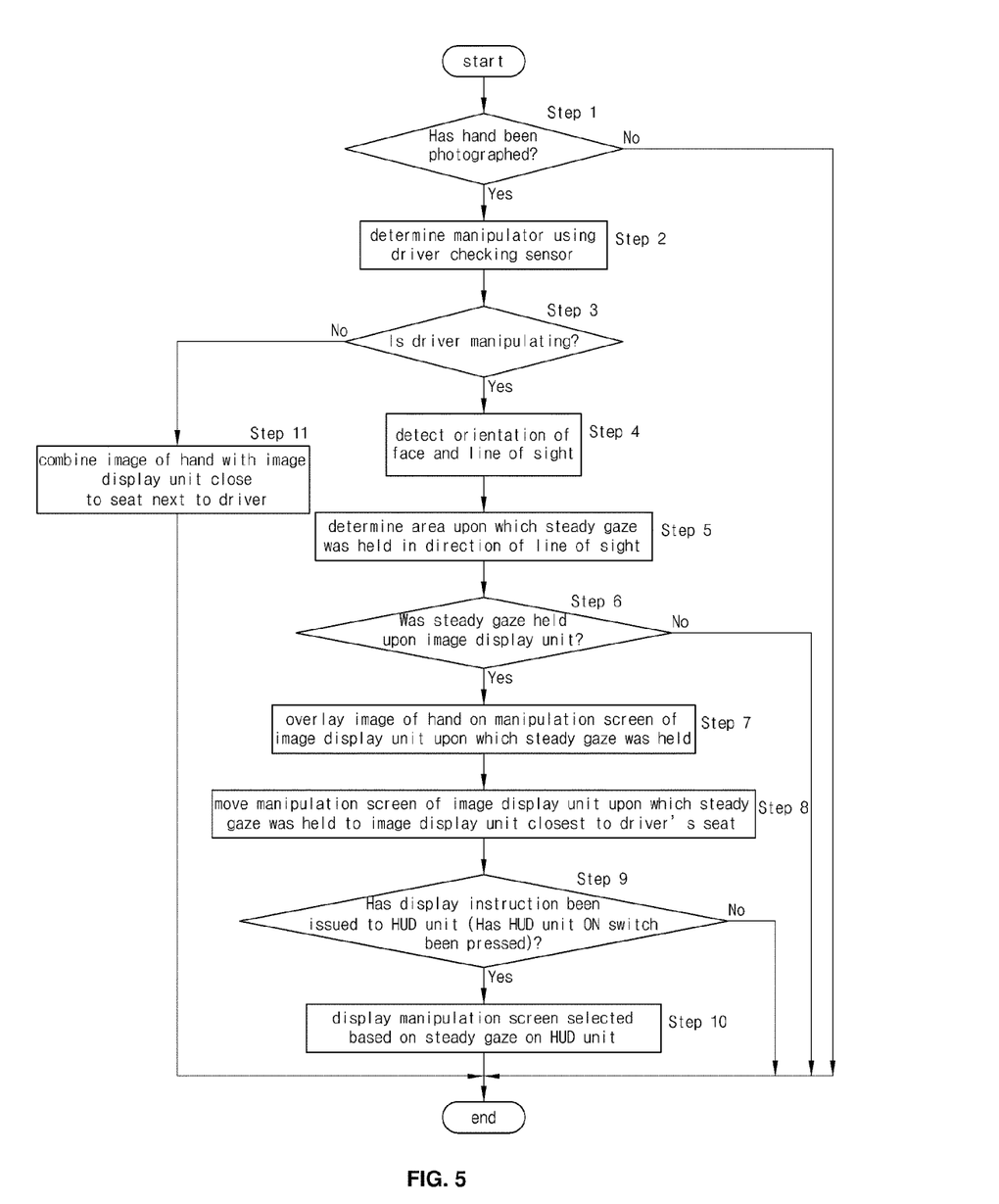
FIG. 5 is a flowchart showing a control process which is performed by the display control unit of FIG. 1.

According to further preferred embodiments of the present invention, for example as shown in FIG. 5, FIG. 5 is a flowchart showing a control process which is suitably performed by the display control unit of FIG. 1. In certain preferred embodiments, FIG. 5 shows the selection of a vehicular device and the displacement of the manipulation screen of the selected vehicular device. In one preferred embodiment, first, the hand is suitably placed on the manipulation unit and a finger is suitably inserted into the depression. Accordingly, whether the photographing unit is suitably photographing the hand is determined at step 1. Preferably, if the hand is determined to be being photographed, whether a manipulator is a driver or a passenger is suitably determined at step 2. In further preferred embodiments, the determination of the manipulator is suitably performed by detecting the thumb using the driver checking sensor of the manipulator checking unit and suitably determining whether the manipulation is performed by the right hand or by the left hand at step 3. Preferably, if the vehicle has a steering wheel on the right side and the thumb of the left hand has been suitably detected, the manipulator is then suitably determined to be a driver. Preferably, in a vehicle having a steering wheel on the right, the determination of a passenger may preferably be performed using the passenger checking sensor of the manipulator checking unit, in which case the manipulator is suitably determined to be a passenger if the thumb of the right hand has been detected. Accordingly, here, the shape of the hand is overlaid and suitably displayed on an image display unit close to the seat next to the driver at step 11. According to further preferred embodiments of the invention, if the passenger is performing manipulation and a desired manipulation screen is not suitably displayed on the image display unit on which the shape of the hand has been suitably overlaid, the manipulation screen of the vehicular device is selected by manipulating a selection button for a desired vehicular device displayed in the image display unit. Accordingly, in the case of a passenger, a manipulation screen for a vehicular device is not selected using line of sight, but by the manipulation of the hand.

In certain exemplary embodiments, for example as shown in FIG. 5, the selection of a vehicular device using line of sight is available only to a driver. In related embodiments, if the manipulator is determined to be a driver, the driver's line of sight is suitably detected using the line of sight detection unit at step 4. In related embodiments, in the case of a driver's line of sight, the direction of the line of sight can be suitably detected based on the orientation of the driver's face and the location of the pupil of the eyeball. A means for suitably detecting the line of sight is well known to one of skill in the art. Preferably, if the direction of the driver's line of sight can be detected via the detection of line of sight, the line of sight has been suitably maintained at a single location for a period equal to or longer than a specific time (for example, 160 ms), the line of sight is suitably determined to be related to a steady gaze at step 5. According to further embodiments, if an object upon which the steady gaze was held is an image display unit is then suitably determined at step 6. Preferably, if the steady gaze was held upon an image display unit, the shape of the hand is suitably overlaid and displayed on the image display unit upon which the steady gaze was held at step 7. For example, in certain preferred embodiments, the line of sight region determination unit suitably determines the driver's line of sight to be related to a steady gaze if the driver's line of sight suitably detected by the line of sight detection unit has been held upon an object for a period equal to or longer than a specific time, and suitably determines whether the object upon which the steady gaze was held is an image display unit, thereby detecting the image display unit upon which the driver held a steady gaze. Preferably, it can be seen that a driver can select a vehicular device using the line of sight. Accordingly, when the selected image display unit is suitably placed at a location remote from the driver, a manipulation screen suitably displayed on the selected image display unit is preferably moved to and displayed on an image display unit closest to the driver at step 8. Accordingly, the locations of the manipulation screens of the plurality of image display units are preferably changed so that the selected manipulation screen can be suitably displayed on an image display unit closest to the driver. Accordingly, using this, the driver can suitably manipulate a manipulation screen without moving his or her line of sight far away from the front of the vehicle.

According to further preferred embodiments and at the subsequent step 9, whether an HUD ON switch mounted on the steering wheel has been pressed is suitably determined. Preferably, when the HUD ON switch has been pressed, the manipulation screen on which the shape of a hand has been suitably overlaid (in this example, the manipulation screen displayed on the image display unit closest to the driver) is also suitably displayed on the HUD unit at step 10. Accordingly, using this, the driver can suitably manipulate the manipulation screen without moving his or her line of sight away from the front of the vehicle to another location.

Figure 6A:
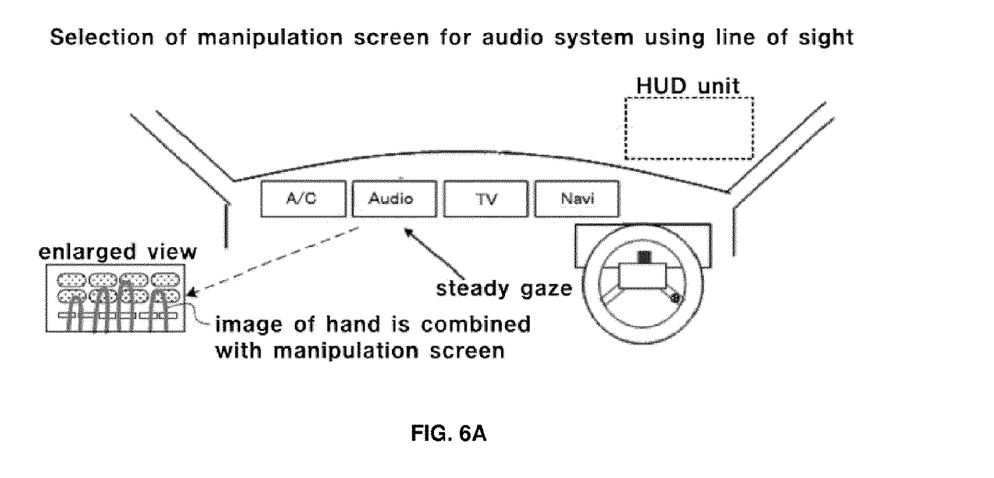
FIGS. 6A and 6B are diagrams illustrating the process of FIG. 5.
Figure 6B:
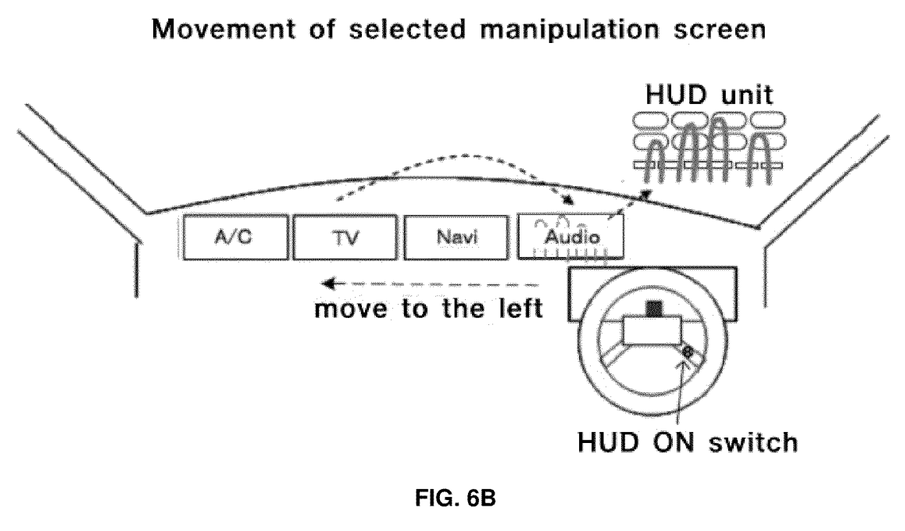

According to further exemplary embodiments of the invention and as shown in FIG. 6, FIGS. 6A and 6B are diagrams illustrating the process of FIG. 5. FIG. 6A illustrates other exemplary embodiments, where a manipulation screen for an audio system has been suitably selected using the line of sight. When a driver held a steady gaze upon the manipulation screen for an audio system which is second from the left, the display control unit can suitably overlay the shape of the hand on the manipulation screen.

Preferably, since the manipulation screen for an audio system selected as shown in FIG. 6A is suitably displayed on an image display unit remote from the driver, the manipulation screen is preferably moved and displayed on an image display unit closest to the driver, as shown in FIG. 6B. Preferably, since the manipulation screen is moved to the closest location, the details of the manipulation screen can be easily viewed, with the result that the manipulation of reducing or increasing volume is facilitated. According to further preferred embodiments, when the HUD ON switch mounted onto the steering wheel is pressed, the manipulation screen for an audio system is also displayed on the HUD unit, so that a user can suitably manipulate volume while viewing the manipulation screen of the HUD unit.

Figure 7:
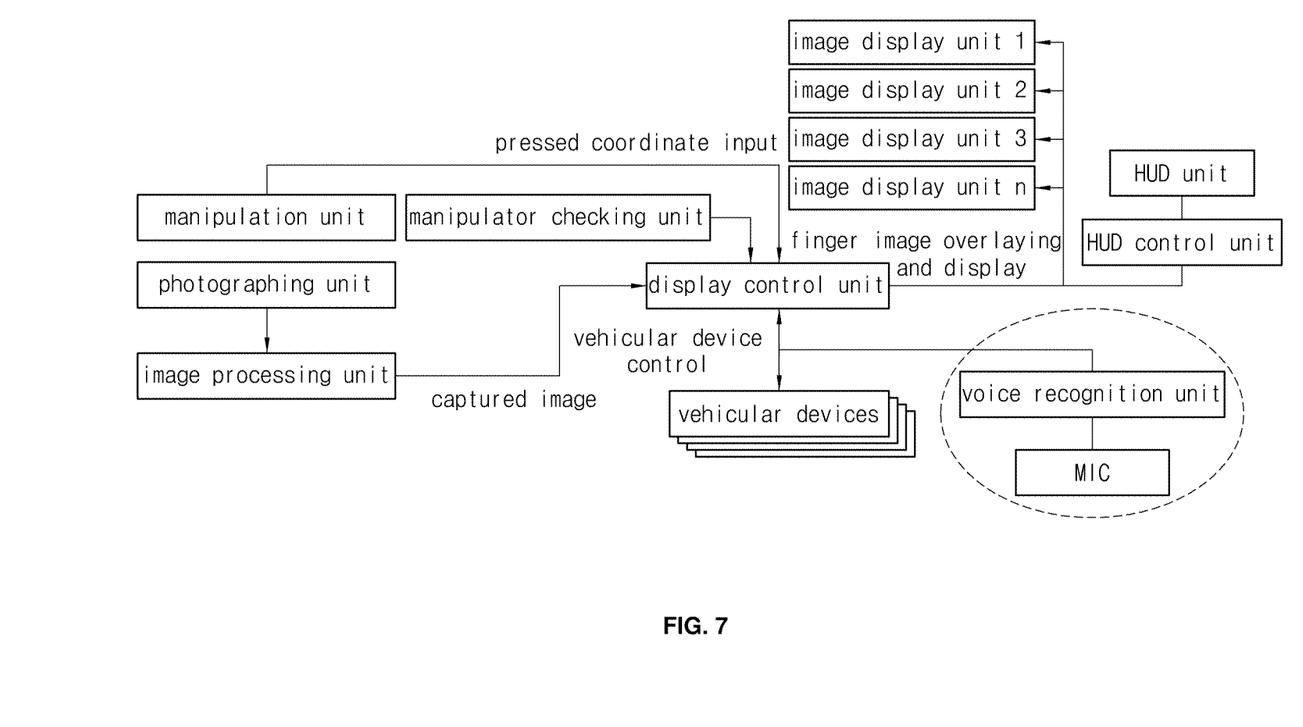
FIG. 7 is a block diagram showing an exemplary apparatus for manipulating vehicular devices according to another embodiment of the present invention, wherein the manipulation apparatus has a construction different from that of the manipulation apparatus of FIG. 1.

According to further exemplary embodiments of the invention and as shown in FIG. 7, FIG. 7 is a block diagram showing an apparatus for manipulating vehicular devices according to another preferred embodiment of the present invention, wherein the manipulation apparatus has a construction different from that of the manipulation apparatus of FIG. 1. Preferably, as shown in FIG. 7, the line of sight detection unit and the line of sight region determination unit of FIG. 1 have been suitably replaced with a microphone MIC and a voice recognition unit. That is, in certain preferred embodiments of the present invention, vehicular devices can be selected using voice recognition, rather than the line of sight.

Preferably, according to the construction of FIG. 7, the voice recognition unit suitably recognizes the driver's voice input to the microphone and detects a vehicular device selected by the driver using the voice, and then the display control unit suitably overlays the photographed shape of the hand on the manipulation screen of the image display unit of the vehicular device detected by the voice recognition unit in the state in which the manipulator checking unit has detected the driver.

In further exemplary embodiments, for example as in the embodiment of FIG. 1, the manipulation screen of the image display unit selected using the voice is suitably displayed on an image display unit closest to the driver and, at the same time, the photographed shape of the hand is suitably overlaid and displayed on the manipulation screen displayed on the closest image display unit.

In other further preferred embodiments, for example as in the embodiment of FIG. 1, when a driver manipulates the HUD ON switch, the selected manipulation screen is suitably displayed on the HUD unit, and the photographed shape of the hand is suitably overlaid and displayed on the displayed manipulation screen.

Accordingly, in further related embodiments, as a result, the apparatus for manipulating vehicular devices according to the present invention is very suitable for a manipulation apparatus that enables a user to rapidly select the manipulation screen of a desired vehicular device, thereby enabling vehicular devices to be manipulated without impairing a driver's driving.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for manipulating vehicular devices, comprising:
    a manipulator checking unit;
    a photographing unit;
    one or more plurality of image display units;
    a line of sight detection unit;
    a line of sight region determination unit; and
    a display control unit,
    wherein the display control unit is used for overlaying a shape of the photographed hand on a manipulation screen of the image display unit upon which the driver held a steady gaze, and
    the display control unit overlays a shape of the photographed hand on the manipulation screen on the image display unit if the manipulator checking unit determines the manipulator to be the driver and the line of sight region determination unit detects the image display unit upon which the driver held a steady gaze, and
    the display control unit changes the locations of the manipulation screens displayed on the plurality of image display units so that the manipulation screen on which the shape of the hand has been overlaid is suitably displayed on the image display unit closest to the driver.

2. The apparatus for manipulating vehicular devices of claim 1, wherein the manipulator checking unit is used for checking whether a manipulator is a driver.

3. The apparatus for manipulating vehicular devices of claim 1, wherein the photographing unit is used for photographing the manipulator's hand.

4. The apparatus for manipulating vehicular devices of claim 1, wherein the one or more image display units are used for displaying respective manipulation screens for vehicular devices.

5. The apparatus for manipulating vehicular devices of claim 1, wherein the line of sight detection unit is used for detecting the driver's line of sight.

6. The apparatus for manipulating vehicular devices of claim 1, wherein the line of sight region determination unit is used for detecting an image display unit upon which a steady gaze is held based on the driver's line of sight detected by the line of sight detection unit.

7. An apparatus for manipulating vehicular devices, comprising:
    a manipulator checking unit;
    a photographing unit;
    one or more image display units;
    a voice recognition unit; and
    a display control unit,
    wherein the display control unit is used for overlaying a shape of the photographed hand on a manipulation screen of the image display unit upon which the driver held a steady gaze, and
    the display control unit overlays a shape of the photographed hand on the manipulation screen on the image display unit if the manipulator checking unit determines the manipulator to be the driver and the line of sight region determination unit detects the image display unit upon which the driver held a steady gaze, and
    the display control unit changes the locations of the manipulation screens displayed on the plurality of image display units so that the manipulation screen on which the shape of the hand has been overlaid is suitably displayed on the image display unit closest to the driver.

8. The apparatus for manipulating vehicular devices of claim 7, wherein the manipulator checking unit is used for checking whether a manipulator is a driver.

9. The apparatus for manipulating vehicular devices of claim 7, wherein the photographing unit is used for photographing the manipulator's hand.

10. The apparatus for manipulating vehicular devices of claim 7, wherein the one or more image display units are used for displaying respective manipulation screens for vehicular devices.

11. The apparatus for manipulating vehicular devices of claim 7, wherein the voice recognition unit is used for recognizing the driver's voice input through a microphone and detecting a vehicular device selected by the driver's voice.

12. The apparatus for manipulating vehicular devices of claim 7, wherein the display control unit is used for overlaying a shape of the photographed hand on a manipulation screen of an image display unit for the vehicular device selected by the driver.

13. The apparatus for manipulating vehicular devices of claim 12, wherein the display control unit overlays a shape of the photographed hand on the manipulation screen on the image display unit if the manipulator checking unit determines the manipulator to be the driver and the voice recognition unit detects the vehicular device selected by the driver's voice.

* * * * *